UNITED STATES PATENT OFFICE.

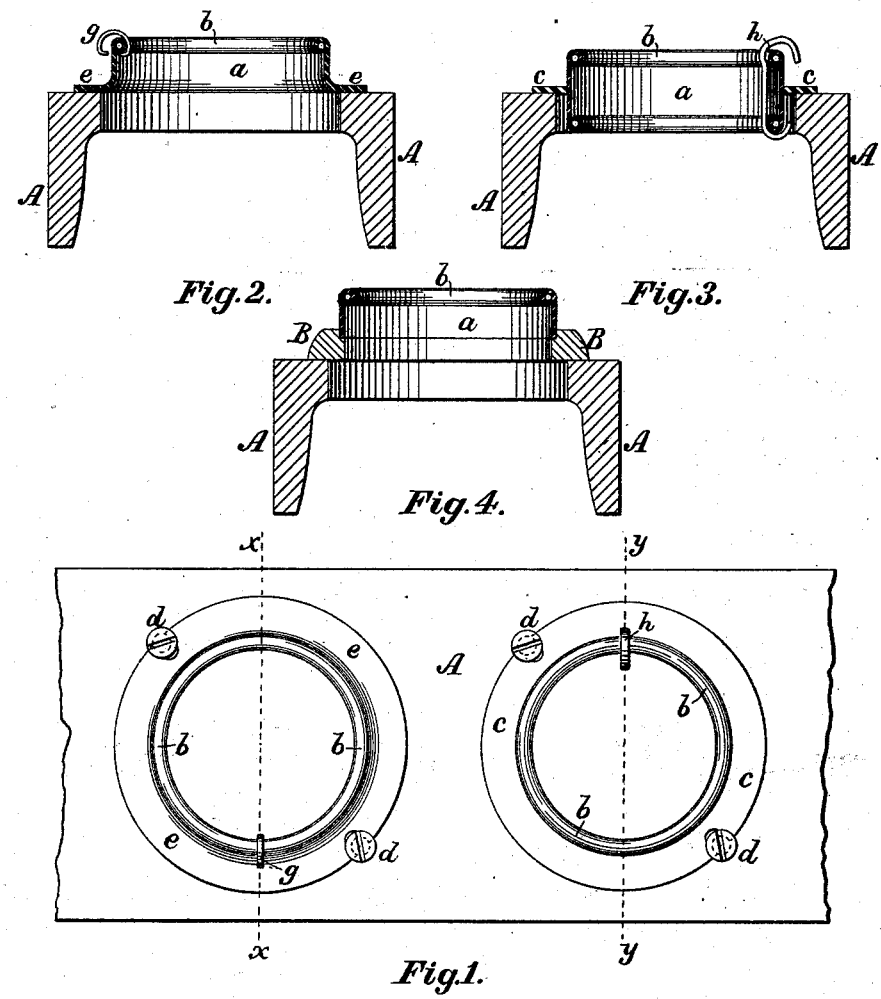

GEORGE D. EDMANDS, OF MILFORD, MASSACHUSETTS.

IMPROVEMENT IN SPINNING-RINGS.

Specification forming part of Letters Patent No. 216,728, dated June 24, 1879; application filed February 10, 1879.

*To all whom it may concern:*

Be it known that I, GEORGE D. EDMANDS, of Milford, in the county of Worcester and State of Massachusetts, have invented certain new and useful Improvements in Spinning-Rings, of which the following, taken in connection with the accompanying drawings, is a specification.

My invention relates to the manufacture of traveler-rings for spinning and twisting frames, and has for its object a reduction of the cost of manufacture and the production of an improved form of race or guiding-flange for the traveler; and it consists, first, in a spinning or twister ring having one or more races, or traveler guiding-flanges, formed upon and projecting inward from the body of the ring, said race or flange being made in the form of an annular segment of a cylinder, formed upon and extending around the end of the body of the ring, the outer surface of which is tangent to its outer surface or periphery, as viewed in cross-section, as will be further described.

It further consists in a spinning-ring having a traveler race or flange projecting inward from the main cylindrical portion of the ring, the form of which race or flange, as viewed in cross-section, is a segment of a circle, or nearly so, the outer periphery of which has the outer surface of the main cylindrical portion of the ring tangential thereto, and an outwardly-projecting flat flange formed upon the other end of the ring to serve as a means of securing said ring to the ring-rail.

Figure 1 of the drawings is a plan of a portion of a ring-rail with two rings secured thereto. Fig. 2 is a transverse section through line $x$ $x$ on Fig. 1, illustrating one form of my improved ring. Fig. 3 is a section on line $y$ $y$ on Fig. 1, illustrating another form of my improved ring, adapted to use as a twister-ring or as a reversible spinning-ring, and Fig. 4 is a similar section illustrating another form of my improved spinning-ring.

In the drawings the same letters of reference indicate the same parts in all the figures.

A is the ring-rail, provided with the usual openings through its top plate, above which is supported the ring in any well-known manner. $a$ is the cylindrical portion or barrel of the ring. $b$ is the race or traveler guiding flange or bead, made cylindrical, or nearly so, in cross-section, and projecting inward from the outer surface of the barrel $a$, as shown. This race $b$ may be formed upon one end only of a plain tube, as shown in Fig. 4, and the ring be held in a separate holder, B, or the race may be formed upon both ends of a plain tube, to which is secured, or upon which may be formed, the centrally-located and outwardly-projecting annular flange $c$, by which and the screws $d$ $d$ passing through said flange the ring may be secured to the ring-rail, or the race $b$ may be formed upon one end of a tube, $a$, upon the opposite end of which is formed the outwardly-projecting annular flange $e$, as shown in Fig. 2.

The flange $c$ on the ring shown in Fig. 3 may be dispensed with, and the double race-ring may be held in the holder B (shown in Fig. 4,) or in any other of the well-known holders now in use, the ring being made of suitable height for a spinning-ring.

These several forms of ring may be made in the usual manner from a metal forging by turning them to the desired shape in a lathe; but I prefer to make them from a flat disk of sheet metal, by means of dies and a peculiar process of manipulation which forms the subject of another application of even date herewith, for the reason that I can produce very much better rings at considerable less cost than by the forging and turning process.

To produce the ring shown in Fig. 2, I first stamp up a cup from a circular disk of sheet metal, leaving the flange $e$ around its mouth, and then punch out the bottom of the cup, thereby forming a tube open at both ends and having an outwardly-projecting annular flange around one end. I then, by means of other dies or molds described in my other application above referred to, turn the unflanged end of said tube inward to form the rounded bead-like flange $b$ projecting inward therefrom, as shown.

To form the rings shown in Figs. 3 and 4, a plain unflanged tube open at both ends is drawn, of a length proportioned to the height of the ring to be made therefrom, and according as to whether the ring is to have one race, as shown in Fig. 4, or two races, as shown in Fig.

3, and said tube is then operated upon by dies to form one or two bead-like races, b, thereon, said dies being modified according as the ring to be produced is to have one or two races. These dies and the process of manipulation by which the flat disk of sheet metal is transformed into a perfectly-formed spinning-ring without the aid of turning-tools, forming, as they do, the subject of another application for a patent, as above stated, need not be further described here.

The advantages of the peculiar form of ring shown and described in this application are that the rings can be made at a much reduced cost, and by virtue of the fact that the race-flange is made rounded in cross-section, so as to conform pretty nearly to the curve of the traveler g. The traveler substantially fits upon the inner rounded surface, and has a more extended bearing thereon, and therefore the ring will last a great deal longer before becoming useless on account of the wear of the race; and whatever position the traveler may be compelled to assume by the draft of the thread, it will have just about the same bearing upon the race, and consequently the friction of the traveler upon the ring will be substantially uniform.

The flange c on the ring shown in Fig. 3 is a flat annular ring cut from a plate of sheet metal, and pressed onto the cylinder a of the ring, and retained in position thereon by friction in a well-known manner.

The ring shown in Fig. 3 may be used as a twister-ring by the use of the traveler h shown thereon, or it may be used as a reversible spinning-ring by applying thereto a traveler like that shown in Fig. 2.

I am aware that spinning-rings have been made from sheet metal before my invention, and therefore I do not claim, broadly, a spinning or twister ring made of sheet metal irrespective of the form of said ring; but

What I claim as new, and desire to secure by Letters Patent of the United States, is—

1. A spinning or twister ring having a traveler race or flange at one or both ends thereof, of a circular, bead-like, or scroll form in cross-section, projecting inward from the main cylindrical portion of the ring, the outer surface of which is tangent to the outer surface of said race-flange, substantially as described.

2. A spinning-ring having a traveler race or flange at one end thereof, of a circular, bead-like, or scroll form in cross-section, and projecting inward from the outer surface of the main cylindrical portion of the ring, which is tangent thereto, as set forth, and an outwardly-projecting annular flange around the opposite end thereof, all formed from one piece of metal, substantially as and for the purposes described.

Executed at Boston, Massachusetts, this 30th day of January, A. D. 1879.

GEO. D. EDMANDS.

Witnesses:
N. C. LOMBARD,
E. A. HEMMENWAY.